United States Patent [19]

Anderson

[11] 4,053,879
[45] Oct. 11, 1977

[54] FAIL SAFE DIGITAL CODE RATE GENERATOR

[75] Inventor: Robert Anderson, Rochester, N.Y.

[73] Assignee: General Signal Corporation, Rochester, N.Y.

[21] Appl. No.: 588,567

[22] Filed: June 20, 1975

[51] Int. Cl.² ................................ G08C 19/28
[52] U.S. Cl. .................... 340/351; 235/150.3; 246/28 R; 328/61; 332/10; 340/47; 340/348; 364/701
[58] Field of Search .............. 340/345, 359, 361, 351, 340/348, 47, 206; 325/143; 179/15 AP, 15 BV, 15.55 R; 332/9 R, 10, 14; 235/150.3; 324/78 R, 78 D; 246/28 R; 307/225; 328/61, 39

[56] References Cited

U.S. PATENT DOCUMENTS

| | | | |
|---|---|---|---|
| 3,088,099 | 4/1963 | DuVall | 340/345 |
| 3,525,039 | 8/1970 | Mindheim | 235/150.3 |
| 3,555,201 | 1/1971 | Kuehnle | 340/359 |
| 3,590,226 | 6/1971 | Lane | 235/150.3 |
| 3,609,729 | 9/1971 | Anderson | 325/143 |
| 3,657,658 | 4/1972 | Kubo | 328/61 |
| 3,670,248 | 6/1972 | Hofmann | 325/141 |
| 3,885,228 | 5/1975 | Katz et al. | 340/47 |

Primary Examiner—John W. Caldwell
Assistant Examiner—James J. Groody
Attorney, Agent, or Firm—Pollock, Vande Sande & Priddy

[57] ABSTRACT

A digital code rate generator comprises a digital number generator driven by a clock running at an appropriate frequency. Preferably the digital number generator is arranged to simultaneously generate digital representations for a plurality of different numbers. These different digital representations are provided to a selector which passes one of said digital representations to an accumulator. The accumulator continually sums the digital representations provided to it by the selector. An output of the accumulator is connected to an overflow detector which is distinctively operated when the sum of the digital representations provided to the accumulator exceeds the capacity of the accumulator. By selecting the frequency of the clock and the particular digital representation which passes the selector, the rate of operation of the overflow detector can be controlled. The output of the overflow detector thus comprises any one of a number of selectable digitally generated code rates.

In another embodiment of the invention the output of the overflow detector is connected to an NAND gate whose other input is provided by the output of a divider, whose input is connected to the clock. The divider is so arranged that its output constitutes the signal carrier in a signaling system. The output of the NAND gate thus comprises a coded carrier which is turned on and off at the code rate generated by the digital code rate generator.

6 Claims, 8 Drawing Figures

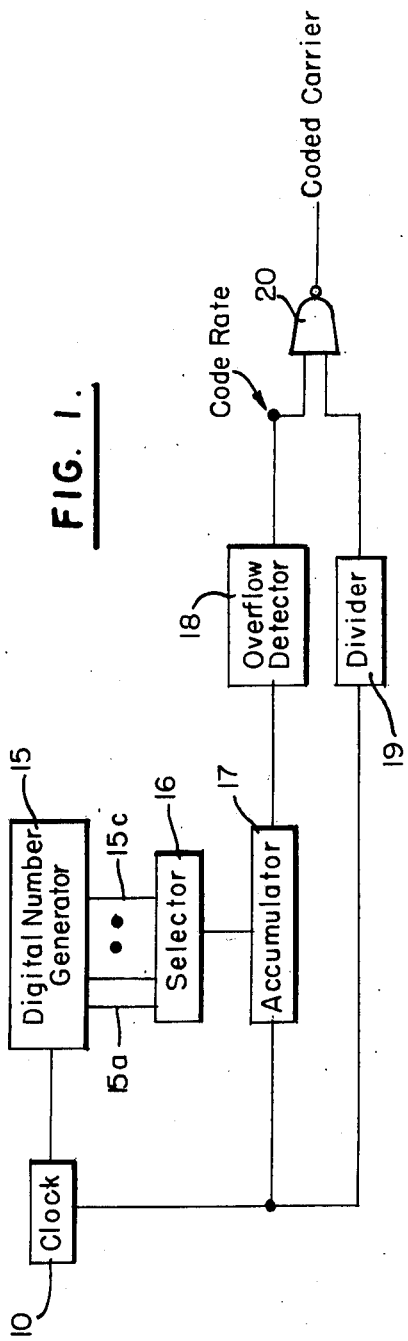
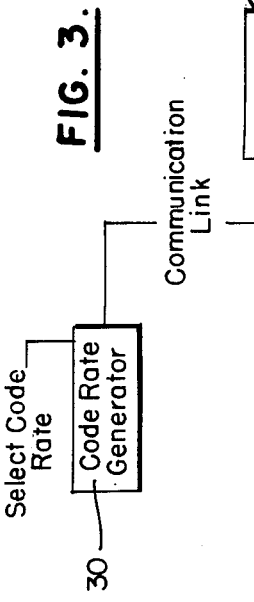
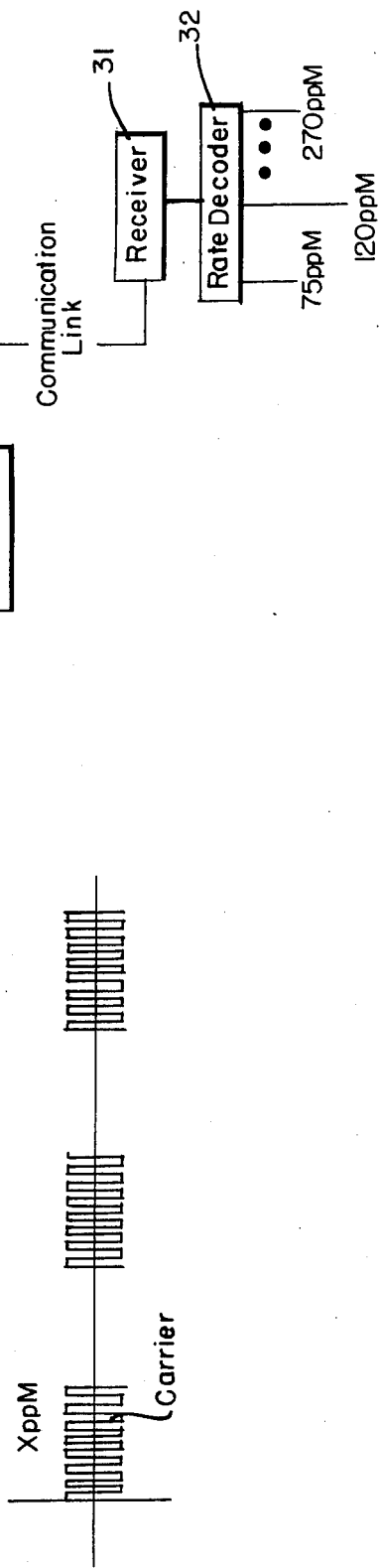
FIG. 1.
FIG. 2.
FIG. 3.

FAIL SAFE DIGITAL CODE RATE GENERATOR

FIELD OF THE INVENTION

The present invention relates to digital code rate generators for use in signaling and/or communication system with particular application to areas in which fail-safe qualities are desirable.

BACKGROUND OF THE INVENTION

Code rate generators have been provided in the prior art for signaling and/or communication systems in which the information is to be transmitted is determined by the rate at which a signal (carrier) is turned on and off. One particular application in which such code rate generators have been used for many years is in the railway signaling and/or control field. For example, a vehicle may be controlled, either automatically or manually, in response to information communicated to the vehicle from the wayside. This information typically takes the form of a carrier signal which is turned on and off at a particular code rate. In a more particular example a 50 hertz carrier may be turned on and off at one of a number of code rates, such as 75, 120, 180, or 270 times per minute (usually referred to as pulses per minute or PPM). The information communicated to the vehicle, by the code rate, may then either automatically control the application of motor and braking power to the vehicle or may control indication lights aboard the vehicle for the information of the vehicle operator. Since human lives may depend upon the correct operation of code rate generators and the systems in which they operate, typically they have been required to exhibit so-called fail-safe qualities. One particular aspect of the fail-safe requirement is that any failures tend to result in a condition which is no more dangerous (or conversely at least as safe) as if the equipment had not failed. It is a practice of the railroads to decode the code rate in such a manner that the higher the code rate the more permissive the indication. Thus, for instance, a 270 PPM code rate may be more permissive than a 180 code rate PPM which itself is more permissive than a 120 PPM code rate, and so on. Thus, the design of the code rate generator should be such that any failures tend to result in a lower code rate than the code rate that would have been generated had the failure not occurred.

There are a number of varieties of code rate generators which have been applied in the past, and which those skilled in the art generally believe exhibit fail-safe qualities. Typically, however, these code rate generators have comprised mechanical oscillators. Furthermore, in the typical case a different mechanical oscillator is required for each different code rate which is to be generated.

With the advent of mass produced and off-the-shelf solid state digital components there has been a desire to apply this apparatus to providing code rate generators. This desire arises from a number of reasons. In the first place, such a digital code rate generator employing solid state circuitry, would be more compact, lower in cost and simplier to maintain then the heretofore employed mechanical code oscillators. In addition, if the digital code rate generator, which was sought after, could be arranged so that only a single piece of equipment was required to generate a plurality of code rates, obviously a large amount of relatively costly and difficult to maintain equipment could be eliminated.

Another objection to the use of solid state apparatus was that a typical failure mode of a solid state oscillator occurs when the frequency of the oscillator increases. If, in the desired code rate generator, the code rate is proportional to the frequency of the oscillator, and the oscillator fails by an unwanted increase in frequency, then the output of the code rate generator would be an erroneously high code rate. By reason of the particular decoding scheme employed by most railroads this would not result in a fail-safe failure. It is therefore an object of the present invention to provide such a code rate generator in which significant increases in frequency of the oscillator employed in the code rate generator are ineffective to generate erroneously high code rates which will be decoded and acted upon by other components in the system.

It is another object of the present invention to provide such a digital, solid state code rate generator which exhibits fail-safe qualities. It is another object of the present invention to provide a digital, solid state code rate generator which is capable of generating one of a selectable number of code rates. It is a further object of the present invention to provide the aforementioned digital, solid state code rate generator which is relatively inexpensive, simple to maintain and more compact than the mechanical code oscillators which have heretofore been used.

SUMMARY OF THE INVENTION

The foregoing and other objects of the present invention are achieved by employing a digital number generator driven by a clock running at an appropriate frequency. The digital number generator may generate digital representation of at least one, and preferably of a plurality of different numbers. The output of the digital number generator is connected, through a selector, to an accumulator. The selector selects one of the digital representations and inputs that representation to the accumulator. The accumulator accumulates the digital representations provided to it by the selector and has an output which is connected to an overflow detector. The overflow detector is operated to change its condition when the sum of digital representations provided to the accumulator exceeds the capacity of the accumulator. By appropriately selecting the clock rate, the digital representation passed to the accumulator and the capacity of the accumulator, the rate at which the overflow detector is operated can be readily controlled. This rate is the desired code rate.

In another embodiment of the present invention the digital code rate generator includes a divider operated by the same clock. The divider is arranged so that its output corresponds to the frequency of the desired carrier in the system in which the code rate generator is to be employed. The output of the overflow detector, and the output of the divider are each connected as inputs to a two input AND gate. The output of this AND gate comprises the carrier coded at the selected code rate.

In this particular embodiment spurious increase in frequency of the clock will result in a spuriously high code rate, but will also result in a spuriously high carrier. The filters in the decoding equipment will, therefore, reject the signal and thus the spurious increase in frequency of the clock will not result in an unsafe condition.

Preferably, selector can select anyone of a number of digital representations to be passed to the accumulator.

The selector can be operated either manually or electronically to select the desired digital representation.

BRIEF DESCRIPTION OF THE DRAWINGS

The invention will now be disclosed in the following portion of the specifications when taken in conjunction with the attached drawings, in which like reference characters identify identical apparatus and in which:

FIG. 1 is a block diagram of one preferred embodiment of the present invention;

FIG. 2 is a schematic showing of a typical output of a preferred embodiment of the invention;

FIG. 3 is a block diagram illustrating how the present invention can be typically employed in an information communication system;

DETAILED DESCRIPTION OF THE PREFERRED EMBODIMENTS

Figure 4A:
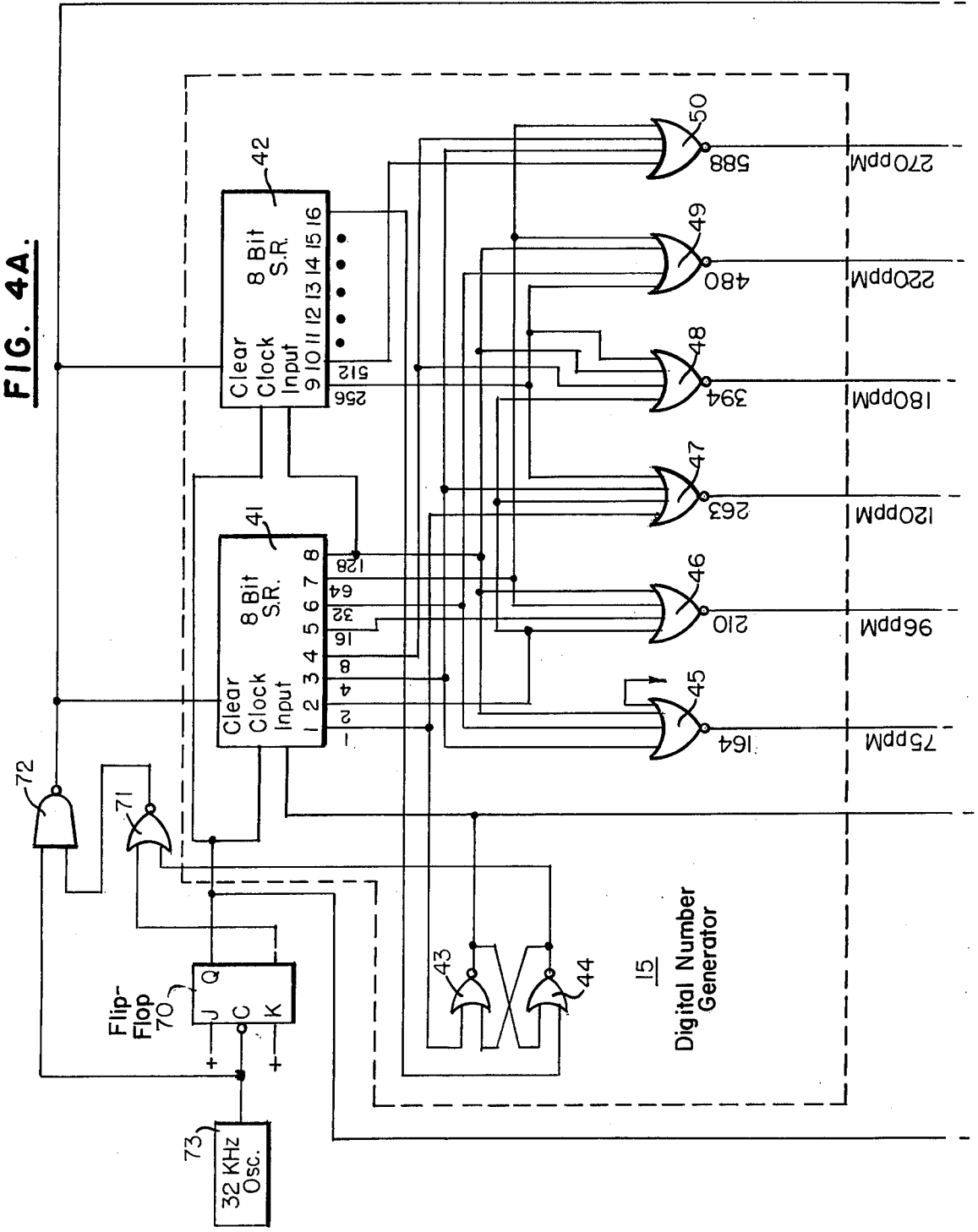
FIGS. 4A and 4B are a schematic diagram of one specific preferred embodiment.

FIG. 1 illustrates a block diagram of a preferred embodiment of the present invention. In FIG. 1, 10 represents a clock which may take the form of any one of a number of different electronic circuits which are well known to those skilled in the art. Preferably, the clock comprises a solid state circuitry. One output of clock 10 is provided as an input to a digital number generator 15. Digital number generator 15 includes a plurality of outputs 15A through 15C. Each one of these outputs passes a digital representation of a different number to a selector 16. Selector 16 selects one of these digital representations and provides that to accumulator 17. Another input to accumulator 17 is provided by the clock 10. An output of accumulator 17 is provided to overflow detector 18. The output of overflow detector 18 is a signal at the code rate which is determined by the frequency of clock 10 and the number whose digital representation is passed by selector 16 to the accumulator 17, as well as by the capacity of the accumulator 17.

In the embodiment of FIG. 1 the divider 19 is also connected to the clock 10. The output of divider 19 is a signal at the frequency of the carrier employed in the system in which the apparatus of FIG. 1 is the code rate generator. An NAND gate 20 has one input connected to the output of overflow detector 18 and a second input connected to the output of the divider 19. The output of NAND gate 20 is the coded carrier, which is coded at the code rate generated by overflow detector 18.

FIG. 2 is a typical representation of the output of NAND gate 20. In particular, it comprises a carrier which is switched on and off at a particular code rate X.

FIG. 3 is a representation of a typical system which would employ a code rate generator such as that of the present invention. More particularly, the code rate generator 30 is controlled by a signal SELECT CODE RATE. This signal operates the selector 16, and the manner in which this occurs will be explained in more detail hereinafter. The signal itself may be generated in any one of a number of ways which are well known to those skilled in the art. In any event, depending upon the particular code rate selected, the code rate generator 30 will provide a coded carrier output to a communication link. The coded carrier, after traversing the communication link is detected by a receiver 31. Receiver 31 includes filters whose band pass is centered at the carrier frequency. The output of the receiver 31 is provided to a rate decoder 32 which includes still other filters and smooting circuit for providing a signal at the one code rate corresponding to the rate at which code rate generator 30 is operating. For example, rate decoders 32 provide an output corresponding to 75 PPM, 120 PPM, etc.

FIG. 4 illustrates a schematic diagram of one implementation of the apparatus of the present invention which was shown in block diagram form in FIG. 1.

More particularly, for purposes of illustrating a specific embodiment a 16 kilohertz clock is employed. This clock includes a 32 kilohertz oscillator 73 and flip-flop 70. The output of the clock (the Q output of flip-flop 70) is coupled to digital number generator 15. As is illustrated in FIG. 4 the digital number generator 15 is capable of generating representations of six different numbers. Specifically 164, 210, 263, 394, 480 and 588, corresponding respectively to code rates of 75 PPM, 96 PPM, 120 PPM, 180 PPM, 220 PPM and 270 PPM. The digital number generator 15 comprises a pair of 8 bit shift registers 41 and 42. Each of these shift registers has applied to it the output of the clock on its clocking inputs. The output of a R-S flip-flop is applied at the input of shift register 41. The flip-flop comprises NOR gates 43 and 44 with its inputs connected to the output of the first stage of shift register 41 and the output of the eighth stage of shift register 42 such that the output of the flip-flop comprises the clock frequency divided by 16 (or 1 kilohertz). In the specific example disclosed herein the output of this flip-flop then comprises a 1 kilohertz signal which is provided as an input to the shift register 41. The output of the eighth stage of shift register 41 is provided as the input to shift register 42. Based on a binary coding scheme the outputs produced at each of the eight stages of shift register 41 and the first and second stages of shift register 42 can represent different numerical values. For instance, the outputs of the eight stages of shift register 41 can represent, respectively, 1, 2, 4, 8, 16, 32, 64, 128. The outputs of the first and second stages of shift register 42 can represent, respectively 256 and 512.

Gates 71 and 72 are arranged to clear the registers 41 and 42 at the end of each counting cycle. NOR gate 71 has one input connected to the Q output of flip-flop 70 and another connected to the R-S flip-flop (gates 43 and 44). The output of gate 71 is one input to gate 72. The other input to gate 72 is provided by the oscillator 73. The output of gate 72 clears the registers 41 and 42.

A plurality of NOR gates 45 through 50 have a plurality of their inputs selectively connected to different ones of the outputs of shift registers 41 and 42 in a predetermined fashion. Thus, for example, NOR gate 45 (whose output represents the number 164), has an input connected to the output of the third stage of shift register 41, another input connected to the output of the sixth stage of shift register 41 and finally, another input connected to the output of the eighth stage of shift register 41. These outputs represent respectively, 4, 32 and 128, whose sum is 164. In like fashion, the inputs of NOR gates 46, 47, 48, 49 and 50 are connected so that the outputs of these gates provide pulse trains which represent the numbers heretofore associated with those gates. Each of the gates 45 through 50 is connected to a different output of digital number generator 15 which are respectively connected to different taps of selector 16. Selector 16, as illustrated in FIG. 4B comprises a rotatable switching contact 16' which is capable of contacting one of the taps corresponding to the output of the gates 45-50. The contact is connected to the input of NOR gate 51. The output of NOR gate 51 comprises the output of the selector 16 which is connected as the input to accumulator 17.

Although the accumulator 17 can be implemented in a variety of fashions, as illustrated in FIG. 4B, the accumulator 17 comprises two 8 bit shift registers, serially connected so as to constitute a single 16 bit shift register and a serial binary adder 54. In particular, the output of NOR gate 51 is connected to one (54A) of the two inputs of adder 54. The other input to adder 54 (54B) is connected to the output of shift register 53. The sum output of adder 54 is connected to the input of shift register 52. The carry out terminal of adder 54 is connected to the overflow detector 18, which will be discussed in more detail hereinafter. Since shift registers and serial binary adders are well known to those skilled in the art further detailed showing of this apparatus is deemed unnecessary.

The overflow detector 18 includes NAND gate 55, connected as an inverter, with its input connected to the carry out terminal of adder 54, and its output connected as one input to a flip-flop 56 the other input to flip-flop 56 is connected to the carry output terminal of adder 54. The clocking input of flip-flop 56 is connected to a 16 kilohertz clock signal. The Q output of flip-flop 56 provides one input to NAND gate 57, whose other input is connected to the 1 kilohertz output of R-S flip-flop comprising NOR gates 43 and 44. Thus, NAND gate 57 is enabled at a 1 kilohertz rate to strobe the condition of flip flop 56 through NAND gate 57. The output of NAND gate 57 is connected to the clocking input of flip flop 58. The Q output of flip flop 58 comprises the code rate signal.

In line with the embodiment illustrated in FIG. 1 a divider 59 has its input also connected to the 1 kilohertz output signal available from the digital number generator. Of course, any other suitable division of the clock frequency could be employed. In any event, the output of divider 59, which is arranged to divide by 10 is provided as the clocking input to flip flop 60, whose Q output thus produces a signal at the nominal carrier frequency of 50 hertz. A Q output of flip flop 60 is provided as one input to NAND gate 61 whose other input is connected to the Q output of flip flop 58. In operation, assuming that selector 16 is in the off position in which it selects none of the digital representations generated by digital number generator 15 the following operation occurs:

By reason of the clock continually changing state the 8 bit shift registers 41 and 42 continue to cycle producing signals on the various inputs to the NOR gates 45 through 50. However, since the selector 16 has selected none of them, these signals are ineffective. The accumulator 17 may or may not contain an initial count, and whether is does is immaterial. Whatever initial count is contained in accumulator 17 will remain. More particularly, the number represented by a particular pulse configuration in the shift registers will cycle in the shift registers 52, 53 to one input of adder 54 and back to shift register 52. Without a second input to adder 54 there will be no carry out and thus, the NAND gate 55 will never be enabled and flip-flop 56 will remain in one state.

Now however, assume that selector 16 selects any particular one of NOR gates 45-50 to be connected to NOR gate 51, to thus provide an input to adder 54. With each cycle of the shift registers 41 and 42 the digital representation of a particular number will be provided to the second input of adder 54. That particular number whose digital representation is thus applied will depend upon which of NOR gates 45 through 50 have been selected by selector 16. Thus, the quantity stored in the accumulator 17 continues to increase at a predetermined rate. The first time overflow occurs is indeterminate since it depends upon the initial number stored in an accumulator 17. However, significantly the rate of overflow is independent of the number initially stored in the accumulator 17, but instead depends upon the capacity of the accumulator and the digital representation supplied to the accumulator 17. Every time a carry out occurs from adder 54, which corresponds to overflow, flip-flop 56 is set. At a predetermined point in the cycle of clock 10, NAND gate 57 is strobed to thus clock flip-flop 58, if flip-flop had been set. Flip-flop 56 is subsequently reset by the clock. The next time overflow occurs the output of NAND gate 57 will clock flip-flop 58, again. Since the J-K flip-flop has both J and K inputs connected to + it will change state each time it is clocked. In other words the rate at which the output of flip-flop 58 changes is equal to the rate at which overflow occurs, and this is equal to twice the desired code rate.

In one embodiment of this invention (not illustrated) the code rate, that is the output of flip-flop 58 can be used directly.

For reasons which have been specified above, it may also be desirable to derive the carrier from the same clock which generates the code rate signal. To this end, the divider 59 has an input connected to the 1 kilohertz output of the divider clock. This divider may provide a division by a factor 10 so that its output, is at a 100 hertz. This is connected as a clocking input to flip-flop 60, which corresponds to a divide by 2 circuit. Thus, its output is at 50 hertz or the carrier frequency. By providing the code rate as one input to an NAND gate and the carrier as another, the output will be the carrier signal modulated at the code rate.

Figure 5:
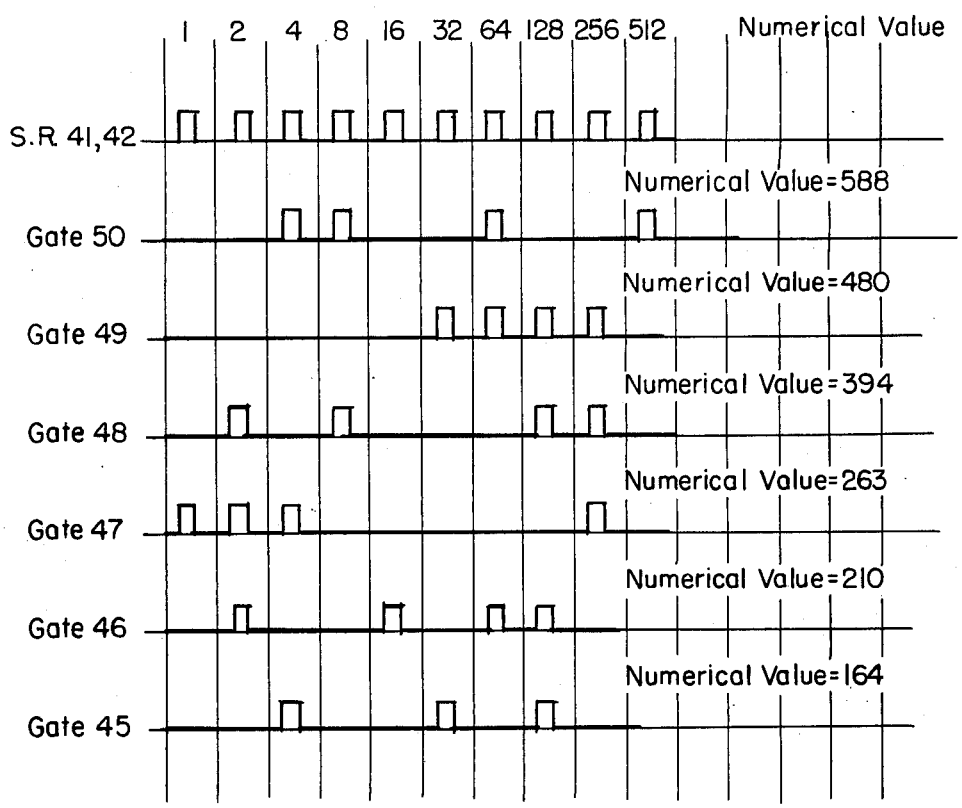
FIG. 5 illustrates certain wave forms produced from the output of the digital number generator.

As an example the first line of FIG. 5 illustrates the outputs of shift registers 41 and 42 produced at a 1 kilohertz rate and the numerical values associated with each of the different pulse outputs. On the next line of FIG. 5 the output of gate 51 is shown when selector 16 connects its input to gate 50. Summing up the numerical value for each of the pulses included in the output of gate 50 we find a numerical value of 588. Similarly, each other line of FIG. 5 illustrates the pulse output, as a function of time, and a numerical value associated therewith each of the other gates 45-49.

As an example, if the selector 16 conducts the output of gate 48 to gate 51, then a digital representation of the numerical value of 394 will be added to the contents of the accumulator 17 for each clock cycle. The accumulator disclosed herein comprises a pair of shift registers 52 and 53, whose total capacity is the quantity of 65535. Thus, with the clock cycling at a 1 kilohertz rate, it will take 166.33 cycles on the average, to fill the accumulator. As a function time the accumulator will be filled, and an overflow pulse will be produced by gate 57 slightly more than six times per second. Since it takes two overflow pulses to produce a single pulse out of flip-flop 58, this is equivalent to 180 pulses per minute. Similar computations can be performed for each of the other different gates to verify that they produce the respective code rates associated with the gates.

The selector means 16 is illustrated as a multi-position switch feeding a selected one of the outputs of gates 45–50 to the adder 54. Those of ordinary skill in the art will understand that in certain applications this mechanical switch can be replaced by electronic switching apparatus which is equivalent thereto. Such electronic switching apparatus is well known to those skilled in the art.

It will be seen from review of the preceeding disclosure, that the apparatus provides a selectable code rate generator. Furthermore, one of the significant advantages of the apparatus of this invention is that it renders fail-safe a relatively common mode of failure. Thus, one common mode of failure to be rendered fail-safe is the shorting, or opening, of a conductor connecting the outputs of either shift registers 41 or 42 to one of the gates 45–50. By reason of the operation of the code generater disclosed herein such a failure mode will result in the pulse train produced by the associated one of OR gates 45–50 representing a quantity lower than the quantity it would have represented had the failure not occurred. This is a fail-safe type failure for the reason that the resulting code rate will be lower than the code rate would have been generated had the failure not occurred. Since the lower the code rate is more restrictive when decoded, the failure is indeed fail-safe.

Another significant failure mode to be rendered fail-safe is the spurious increase in frequency of the clock. Such a spurious increase in frequency will result in an increase in the code rate generated by the apparatus of this invention which, standing along, could represent a non-safe failure. However, in the embodiment illustrated in FIGS. 1, 4 and 6 the carrier is also generated by the clock. As a result, if the clock exhibits a spurious increase in frequency the carrier produced by the divider will also exhibit the same increase in frequency. If the increase in frequency is significant enough to potentially cause an unsafe indication, the filters in the code receiver will reject the signal inasmuch as the carrier frequency will no longer be correct. Thus, generating both the code rate and the carrier from the same clock renders this potential failure mode fail-safe.

Furthermore, since the code rate is a dynamic signal any failure of one or more of the electronic components which renders the output of the code rate generator to be non-dynamic will be fail-safe in that the signal thus generated will not be decoded as any recognizable code rate.

Figure 6:
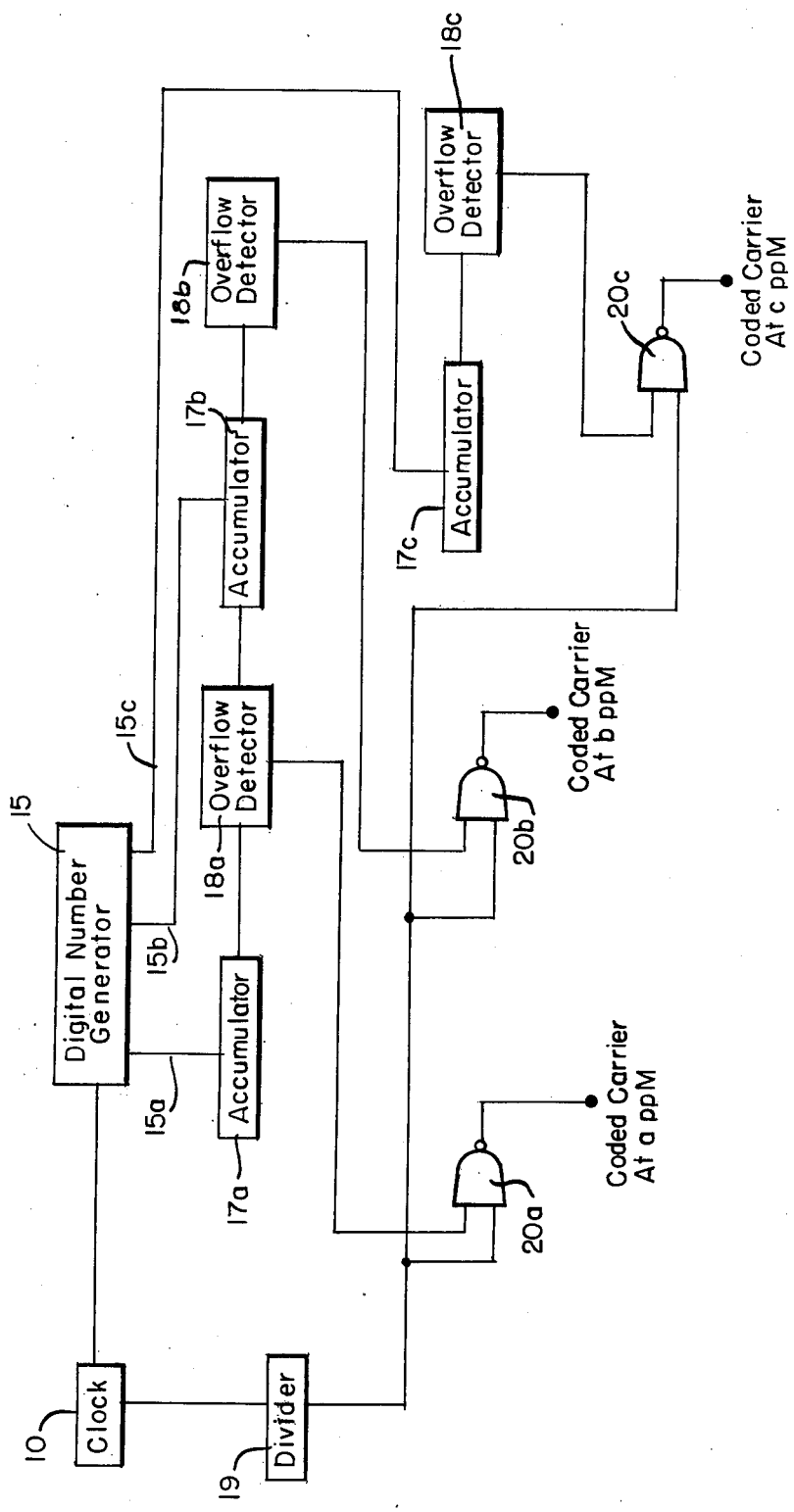
FIG. 6 is a block diagram of another preferred embodiment of the invention.

FIG. 6 illustrates another embodiment in which the selector 16 has been omitted, and instead a different accumulator 17, overflow detector 18 and gate 20 has been provided for each of the different outputs of digital number generator 15. Thus, FIG. 6 illustrates a clock 10 driving the digital number generator and a divider 19. One output, 15A of the digital number generator is provided as an input to accumulator 17A, whose overflow output is provided as an input to overflow detector 18A. The output of overflow detector 18A is connected as one input to gate 20A, the other input is provided by the output of divider 19. In similar fashion output 15B of the digital number generator is provided as an input to accumulator 17B, whose output is provided as the input to overflow detector 18B. The output of overflow detector 18B is provided as one input to gate 20B, whose other input is provided by the output of the divider 19. Finally, output 15C of the digital number generator is provided as an input to accumulator 17C, whose output is provided as an input to overflow detector 18C. The output of this overflow detector is provided as an input to gate 20C, whose other input is provided by the output of divider 19. The specific configuration of the digital number generator 15 and each of the accumulators 17A, 17B and 17C and overflow detectors 18A, 18B and 18C may take the form which is illustrated in FIG. 4. The output of each of gates 20A, 20B and 20C will take the form shown in FIG. 2 except that the code rate for each of these outputs will be different, and will depend upon the particular digital representation which is passed to the associated accumulator. Those of ordinary skill in the art will understand that the number of different outputs of digital number generator 15 can be varied depending upon the number of different code rates that are desired. In addition, of course, for each different output of digital number generator 15 a different combination of accumulator, overflow detector and AND gate would be provided to produce, at the output of each of the NAND gates the carrier signal coded at different code rates. In a typical system, the selection of the particular code rate desired would determine which of the outputs of the different NAND gates 20 would be communicated to the communication link (FIG. 3). Furthermore, those skilled in the art will understand that, in line with the unillustrated embodiment, the divider 19 and each of the NAND gates can be omitted if it is merely desired to generate a plurality of different code rates in order to modulate a carrier which is not derived from the clock 10.

Figure 4B:
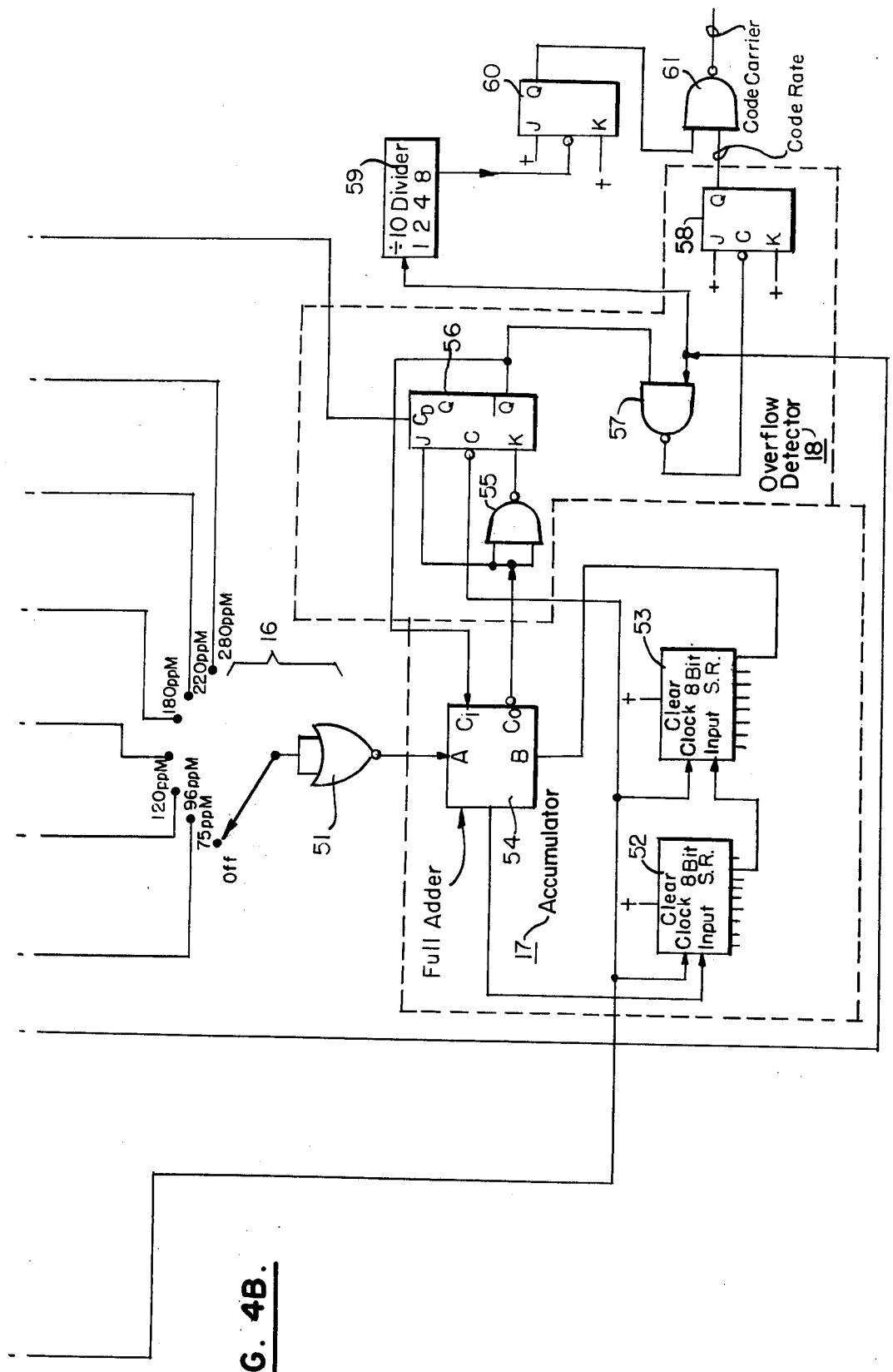
Figure 7:
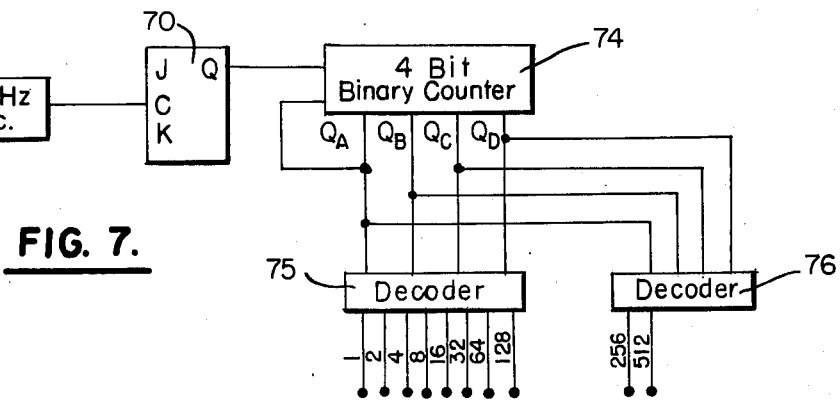
FIG. 7 is another preferred embodiment, alternative to that shown in FIG. 4A.

FIG. 7 illustrates still another alternative to the digital number generator illustrated in FIG. 4A. In FIG. 7, apparatus which is identical to the apparatus of FIGS. 4A and 4B employs like reference characters. More particularly, the gates 43, 44, 71, 72 as well as shift registers 41 and 42 have been deleted, and in their stead a four bit binary counter 74, and decoders 75 and 76 are provided. The four bit binary counter 74 has four outputs, $Q_a$ through $Q_d$. Each of these outputs are connected as an input to both decoders 75 and 76. Decoder 75 has eight outputs and decoder 76 has two outputs. Each of these outputs has associated therewith a number which is represented by the output. These outputs are connected to the gates 45–50 in the manner illustrated in FIG. 4A. An input to the four bit binary counter 74 is provided by the Q output of flip-flop 70 whose clocking input is connected to the output of oscillator 73.

The binary counter 74 and decoders 75 and 76 operate as a ring counter changing its outputs as flip-flop 70 operates in response to the oscillator 73. Although the arrangement of FIG. 7 produces the same outputs as does the arrangement illustrated in FIG. 4A, it will be apparent that it does so with somewhat less apparatus and is, therefore, simplier.

Those of ordinary skill in the art will also understand that the use of binary digital representations is not an essential feature of this invention. Although the binary representation admits of easy implementation due to the numerous variety of binary digital circuit which are available, other digital representations such as biquinary, decimal and hexadecimal can also be employed, among others.

Those skilled in the art will readily understand that the specific clock frequency and numerical output representation of the different gates can be varied to give the same or different equivalent code rates. Furthermore, it should be apparent to those skilled in the art that many changes can be made to the specific embodiment illustrated in FIG. 4. For instance, the functions performed by shift registers 41, 42, 52 and 53 can be provided by other apparatus such as delay line, disk or drum memories, or the like.

Likewise, although specific embodiments in the invention illustrating negative logic have been employed, those skilled in the art will understand how to employ the priciples of this invention with positive logic apparatus.

What is claimed is:

1. A digital code rate generator with fail-safe attributes for generating a code rate, said digital code rate generator comprising:

clock means generating a continuous pulse train at a determined repetition rate, first means, driven by said clock means pulse train for generating a digital representation of a multi-digit decimal number, said digital representation comprising a single serial pulse stream of determined duration, said first means repetitively generating said representation, a representation generated in response to each clock pulse train segment an accumulator having a numerical capacity and means connecting said accumulator to said first means, for summing, in said accumulator, the representations of said digital number passed by said connecting means, an overflow detector operated by said accumulator when the sum of digital representations passed to said accumulator exceeds said accumulator numerical capacity, to produce a signal, continued operation of said clock means, first means, accumulator and overflow detector producing additional signals, dividing means driven by said clock means, a multi-input gate, one of said gate inputs connected to said overflow detector and another said input connected to said divider, whereby said overflow detector produces a timed series of signals corresponding to a code rate, and said gate produces an output comprising a modulated carrier, modulated at said code rate.

2. The apparatus of claim 1 in which said first means is capable of producing one of a plurality of digital representations of a multi-digit decimal number, and further includes selecting means for selecting a one of said digital representations to be produced.

3. A code rate generator having fail-safe attributes, including clock means, a number generator driven by said clock means for repetitively producing a digital representation of a number, summing means connected to said number generator for summing said digital representation repetitively produced by said number generator, overflow means operated by said summing means whenever a quantity summed in said summing means exceeds a predetermined amount, to produce a signal train at a code rate; wherein the improvement comprises dividing means operated by said clock means to produce a carrier and gate means driven by said carrier and said signal train whereby said gate means generates a carrier coded at said code rate.

4. The apparatus of claim 3 wherein said number generator includes counting means having a plurality of outputs, each of said outputs producing a pulse train of different predetermined repetition rate in response to operation of said clock means, a plurality of multi-input logic gates, with inputs of said logic gates selectively connected to different outputs of said counter, and connecting means connecting said multi-input logic gates to said summing means.

5. The apparatus of claim 4 wherein said connecting means selects the output of a single one of said multi-input logic gates for connection to said summing means.

6. The apparatus of claim 4 wherein said summing means includes a plurality of accumulators and said overflow means includes a plurality of overflow detectors, said connecting means connecting different ones of said multi-input logic gates to different ones of said accumulators, each of said accumulators connected to a different one of said overflow detectors.

* * * * *